United States Patent [19]
Hooper, III

[11] 3,961,863
[45] June 8, 1976

[54] WATER ACTION POWERED PUMP

[76] Inventor: Lee Ezekiel Hooper, III, 11 Sandpiper Road, Tampa, Fla. 33609

[22] Filed: Jan. 13, 1975

[21] Appl. No.: 540,544

[52] U.S. Cl. ............................... 417/334; 60/499; 60/501; 92/39; 92/42; 92/44; 290/42; 290/53
[51] Int. Cl.² ...................................... F04B 17/00
[58] Field of Search ........................... 417/331–334, 417/473; 92/39, 44; 60/398, 498–501; 290/42, 53

[56] References Cited
UNITED STATES PATENTS

| | | | |
|---|---|---|---|
| 632,826 | 9/1899 | Rice | 417/332 |
| 2,610,824 | 9/1952 | Grier | 92/44 X |
| 2,951,450 | 9/1960 | Fisher | 417/473 X |
| 3,268,154 | 8/1966 | Aranyi | 417/333 |
| 3,335,667 | 8/1967 | Murphy | 417/331 X |
| 3,598,505 | 8/1971 | Greene et al. | 417/473 X |
| 3,603,804 | 9/1971 | Casey | 417/332 X |
| 3,758,788 | 9/1973 | Richeson | 417/332 X |
| 3,879,950 | 4/1975 | Yamada | 417/333 X |

*Primary Examiner*—William L. Freeh
*Assistant Examiner*—Edward Look
*Attorney, Agent, or Firm*—Lowe, King, Price & Markva

[57] ABSTRACT

Method and apparatus wherein complex multiplanar surface motion of the sea or other fluid body is converted into usable energy. One embodiment of the apparatus comprises a pair of flexible tubular pumping elements that pump a fluid, such as sea water, to load such as a storage means or an energy converter such as a turbine driven prime mover. The apparatus makes use of multiplanar waves and surface currents that axially flex the pumping elements to provide hydraulic or pneumatic pressure for pumping the water. Floats distributed along the pumping elements support the apparatus horizontally at the surface of the sea and act as a breakwater. Lever arm struts, attached to the floats, are coupled together with swivel connector linkage to form a flexible beam or truss structure that permits the pumping elements to flex axially as complex wave systems and currents apply natural multiplanar forces to the floats. Protective chord segments, connected between adjacent strut ends, act as an expansion curb to prevent the pumping elements from flexing or expanding excessively due to strong surface currents and waves. Output tube segments connected to outlet valves on the pumping elements direct pumped fluid to a collector tube for transfer to the load. The output tube segments may be formed of flexible tubing or the lever arm struts may be tubular and adapted for delivering the pumped fluid to the collector tube. To maximize sensitivity of the apparatus and minimize vulnerability to damage the fluid carrying collector tube is maintained below the surface of the water and the apparatus is provided with an antifouling coating to prevent such resistance as barnacle build-up.

17 Claims, 6 Drawing Figures

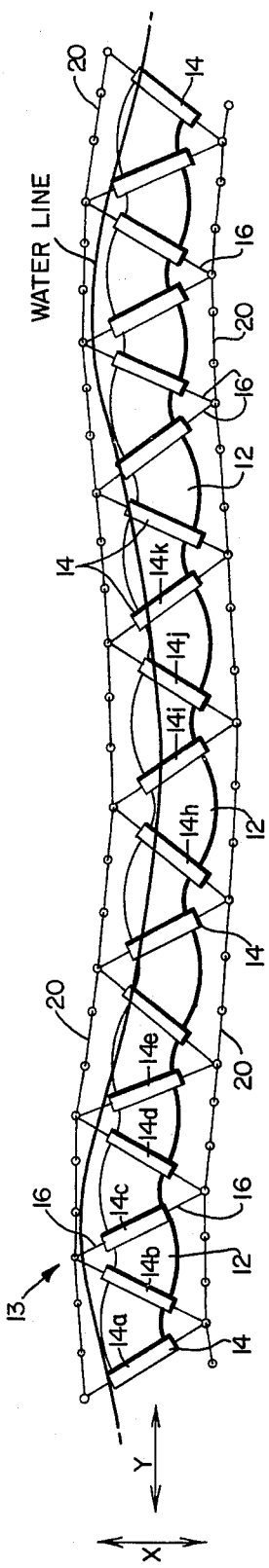
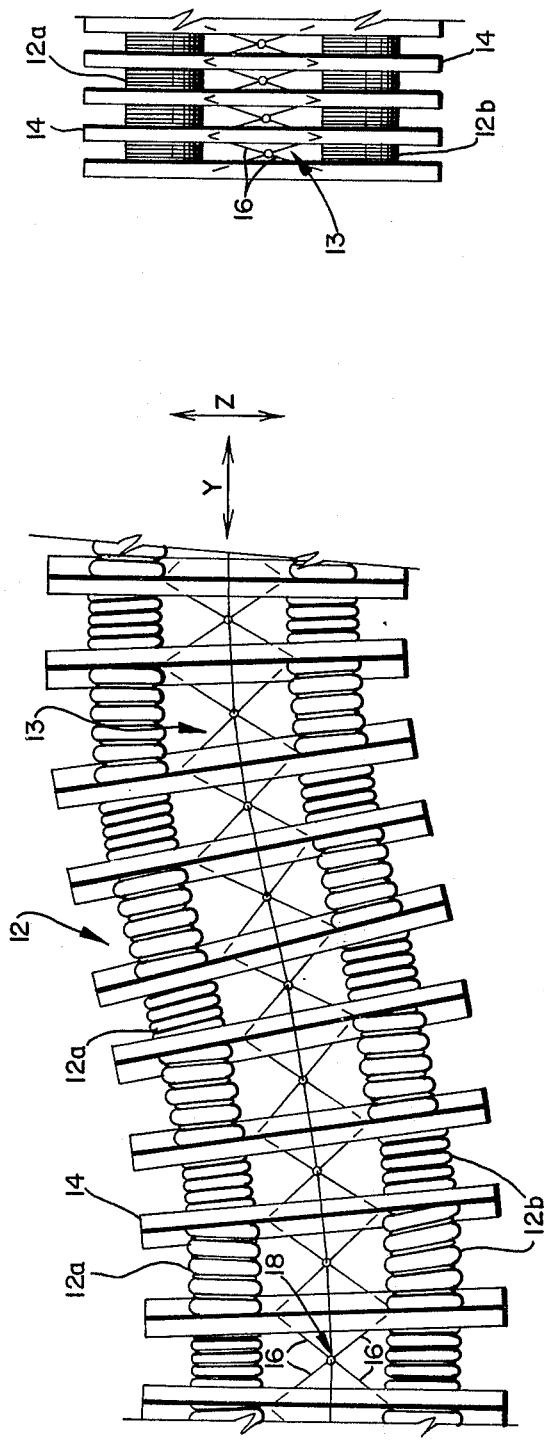
FIG. 2
FIG. 3B
FIG. 3A 3,961,863

WATER ACTION POWERED PUMP

FIELD OF THE INVENTION

The present invention relates generally to energy conversion, and more particularly to a method and apparatus, wherein the natural multiplanar forces of waves and surface currents are converted into usable energy.

BACKGROUND OF THE INVENTION

It is well known that a vast quantity of natural energy is contained in waves and surface currents of large bodies of water. For example, complex wave motion provided by naturally occurring superimposed wave systems and surface currents causes a floating object to receive multiplanar forces and move in complex orbits. The direction and intensity of the multiplanar forces is related respectively to the direction and diameter of the respective orbits.

Prior attempts have been made to convert wave motion into usable energy. Typically, flotation wave motors provided heretofore float on the surface of the water and incorporate pumping elements that respond to only vertical motion. Generally, the vertical motion of surface waves has been used to actuate pumps for either compressing air or moving water to a load, such as a turbine driven prime mover.

Current activated wave motors used heretofore typically include a paddle plate that extends through the surface of the water and oscillates in horizontal currents rather than vertical wave motion. Tidal and other natural variations are neglected.

While prior fluid activated apparatus of which I am aware have been somewhat satisfactory, efficiency of energy conversion and durability of the apparatus are low and therefore use of these apparatus has not been widespread. A primary reason for low energy conversion efficiency in typical surface apparatus is that they respond only to one of vertical surface wave motion or horizontal current motion of the water. In fact, in order to prevent damage, these apparatus are usually constrained against movement in response to both vertical waves and horizontal currents. Therefore, the energy contained in either currents or waves at the surface of the water remains untapped. Further, these apparatus are vulnerable to overload and frequent damage during periods of excessive water movement.

OBJECTIVES OF THE INVENTION

Accordingly, it is one object of the present invention to provide a new and improved method and apparatus for efficiently converting the natural fluid motion at and near the fluid surface into usable energy.

Another object of the present invention is to provide a method and apparatus for converting natural surface motion of fluid into usable energy utilizing natural horizontal and/or vertical forces available at and near the fluid surface.

Still another object of the present invention is to provide a method and apparatus for converting the natural surface motion of fluid into usable energy with a pump that is activated by multiplanar forces at and near the fluid surface.

Yet another object of the present invention is to provide a method and apparatus for efficiently converting the natural surface motion of water into usable energy by utilizing the force magnification properties, or mechanical advantage, of leverage in the strut members of a beam or truss structure for efficiently activating a pump.

Another object of the present invention is to provide a new and improved apparatus for converting natural surface motion of water into usable energy wherein the apparatus has a simple, yet sturdy construction, and operates in a natural environment.

BRIEF DESCRIPTION OF THE INVENTION

In the method and apparatus, wherein the movements of the sea or other fluid body at or near the surface are converted into usable energy, at least one flexible tubular pumping element is supported by floats interconnected by means of a flexible multiplanar beam or truss structure. The pumping action originates from the element being flexed axially by the multiplanar movement of the fluid, such as water, acting on the floats. The multiplanar movement of waves and currents deflects a multiplanar truss system by the action of bending moments from flotation, flow resistance and gravity.

Preferably at least two parallel disposed pumping elements are utilized in the apparatus, and two or more of these pairs are connected from providing the desired pressure and volume output. Each pumping element contains a variable volume chamber and may be of a bellows type including a corrugated flexible tube reinforced with spiral or ring ribs.

The floats are distributed along substantially the entire length of the pumping elements so that the apparatus floats horizontally at the surface of the water. The fluid to be pumped is preferably water from the body in which the apparatus is floating, but of course any other suitable liquid or gas could be used.

The flexible multiplanar truss structure comprises a horizontal system and a vertical system, both of which include lever arm struts having chord segment linkage between strut ends. The chord segments function as an expansion curb which permits unrestrained deflection of the truss under compressive, or positive, bending moments but, after sufficient expansion occurs to refill the pumps, curbs further expansion of the pumps caused by applied tensile, or negative, bending moments. The chord segments also prevent the pumping elements from flexing excessively during rough surface activity of the water. Additional chord segments may be connected between adjacent floats to prevent damage to the floats by end-to-end collision. The struts which form the web of the truss, are rigid to resist lateral beam loading as well as conventional axial compression and tension.

The pumps are acted on in the vertical truss system like a nut in a nutcracker while in the horizontal truss system the same pumps are acted on like an object secured in the jaws of pliers. When the chord segments are extended to their limit, the stress diagram configuration of the vertical truss system is like that of a conventional Warren Truss. Compression caused by the bending moments axially flexing the pumping elements is resisted by only the working pressure within the elements. Tension caused by the bending moments is resisted by chord segment linkage between the strut ends after the pumping elements have expanded to refill.

In the preferred embodiment, lever arm struts are connected to each float. The struts are coupled together at their ends with chord segments through swivel connector linkage to form the flexible multiplanar beam or truss structure. The swivel connector linkage permits the pumping elements to freely flex axially in response to the multiplanar forces of waves and surface currents. The natural forces, applied to the floats, are concentrated at the swivel connectors as reaction forces that axially flex the pumping elements through the lever arm struts. The leverage of the struts magnifies the natural multiplanar forces of the water for increased pumping action.

A plurality of inlets are spaced along the length of the pumping elements and extend into the water for drawing in water when the elements flex. A plurality of outlets extend between the pumping elements and a collector tube for transferring the pumped water to a load, such as an electric generator or a storage facility.

Flexible tube segments are connected between the outputs and the collector tube for outputting the pumped water. The segments freely yield to the motion of the floats on the surface of the water. Alternatively, taking the place of the flexible tube segments, the lever arm struts may be tubular in construction and connected between the outlets and collector tube for fluid transfer.

In order to maximize efficiency, the fluid carrying collector tube is preferably oriented below the surface of the water. An anti-fouling coating may be provided over the entire apparatus to prevent loss of sensitivity due to such resistance as barnacle build-up.

Still other objects and advantages of the present invention will become readily apparent to those skilled in this art from the following detailed description, wherein I have shown and decribed only the preferred embodiments of the invention, simply by way of illustration of the best modes contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

BRIEF DESCRIPTION OF THE DRAWINGS

FIG. 2 is a side view of the apparatus responding to vertical wave motion of the sea;

FIG. 3A is a top view of the apparatus responding to horizontal surface currents in the sea;

FIG. 3B is a top view of the apparatus compressed;

DETAILED DESCRIPTION OF THE PREFERRED EMBODIMENT

Figure 1:
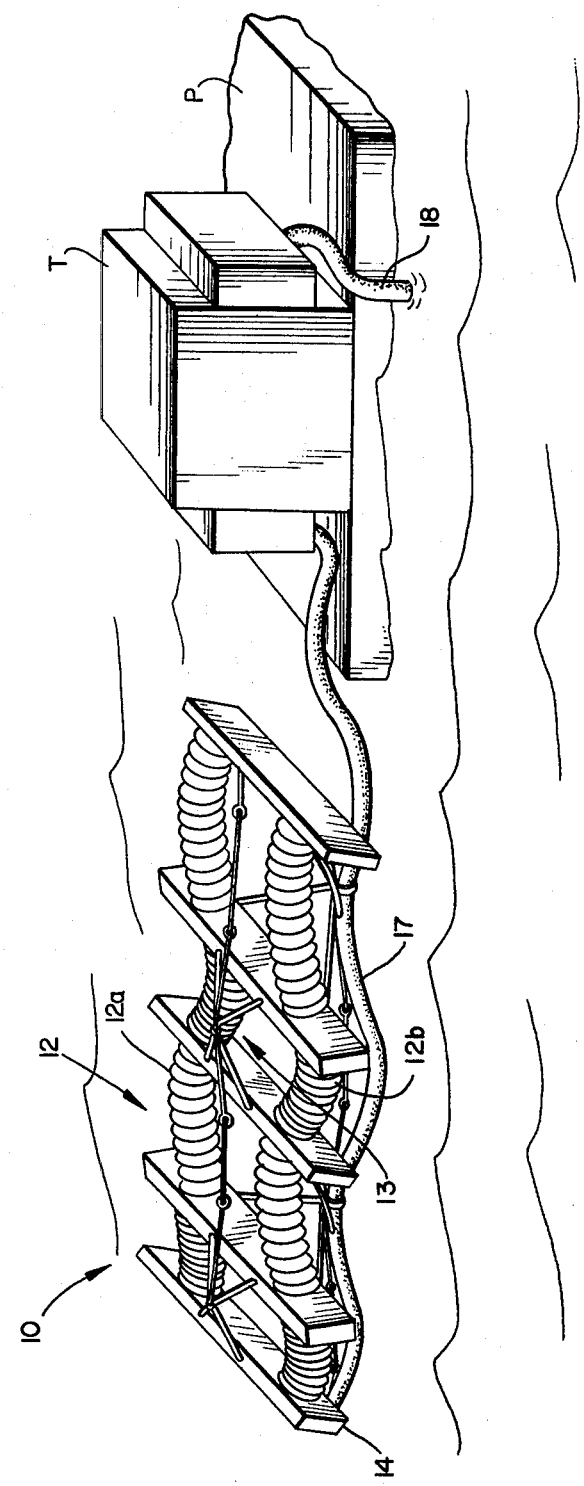
FIG. 1 is a perspective view of the apparatus of the present invention utilizing sea water to drive an electric generator on a sea platform.

With reference to FIG. 1, there is shown in a perspective view an apparatus 10 for converting the surface movement of water into usable energy in accordance with the principles of the present invention. Conversion apparatus 10 comprises a pair of variable volume chamber pumping elements 12a and 12b horizontally supported near the surface of the water by a plurality of transversely positioned floats 14. Although two pumping elements 12a and 12b are preferred, it is understood that other numbers of pumping elements could be provided in apparatus 10 without departing from the spirit of the invention.

Floats 14, formed of a structurally reinforced sealed buoyant compartment which may contain a material such as a closed cell foamed plastic, are disposed substantially evenly along the entire length of pumping elements 12a and 12b. The floats 14 are large enough to buoyantly support pumping elements 12a and 12b in a semi-submerged condition. A collector tube 17 is supported by apparatus 10 below the surface of the water and transfers water or other fluid, either liquid or gas, pumped by the apparatus, to a load such as a turbine for electric generator T located on a sea platform P.

In the preferred embodiment, sea water is pumped by apparatus 10 to drive the turbine of generator T. The sea water is returned to the sea through return pipe 18. Where another suitable fluid, either gas or liquid is used, the fluid may be recirculated back to apparatus 10 by conventional closed system means (not shown).

Overviewing the invention, apparatus 10 floats in active strata horizontally along the surface of the water and pumping elements 12a and 12b in the apparatus are activated by the complex multiplanar surface motion of the water. Multiplanar activation of the pumping elements is converted into pressure for pumping sea water to the electric generator T. These natural multiplanar forces, exerted on floats 14, are applied to the pumping elements 12a and 12b through a flexible beam or truss structure 13. The natural multiplanar forces are amplified by the mechanical advantage of the beam or truss structure 13. As the entire apparatus 10 flexes vertically and horizontally, the axial flexing of pumping elements 12a and 12b drives the pumped fluid, e.g., water, through output tube 17 to the generator T for conversion into electricity. Because both vertical buoyancy and horizontal flow movements of the water at the surface thereof are utilized for energy conversion in apparatus 10 of the present invention, conversion efficiency is high.

Referring to FIGS. 2 and 3A, vertical and horizontal flexing action of the multiplanar pumping elements 12a and 12b according to the present invention are shown (note force arrows X, Y and Z, respectively). The vertical and horizontal flexing action causes axial flexing of the elements which varies the volume of the pump chambers to create hydraulic pressure.

Figure 4:
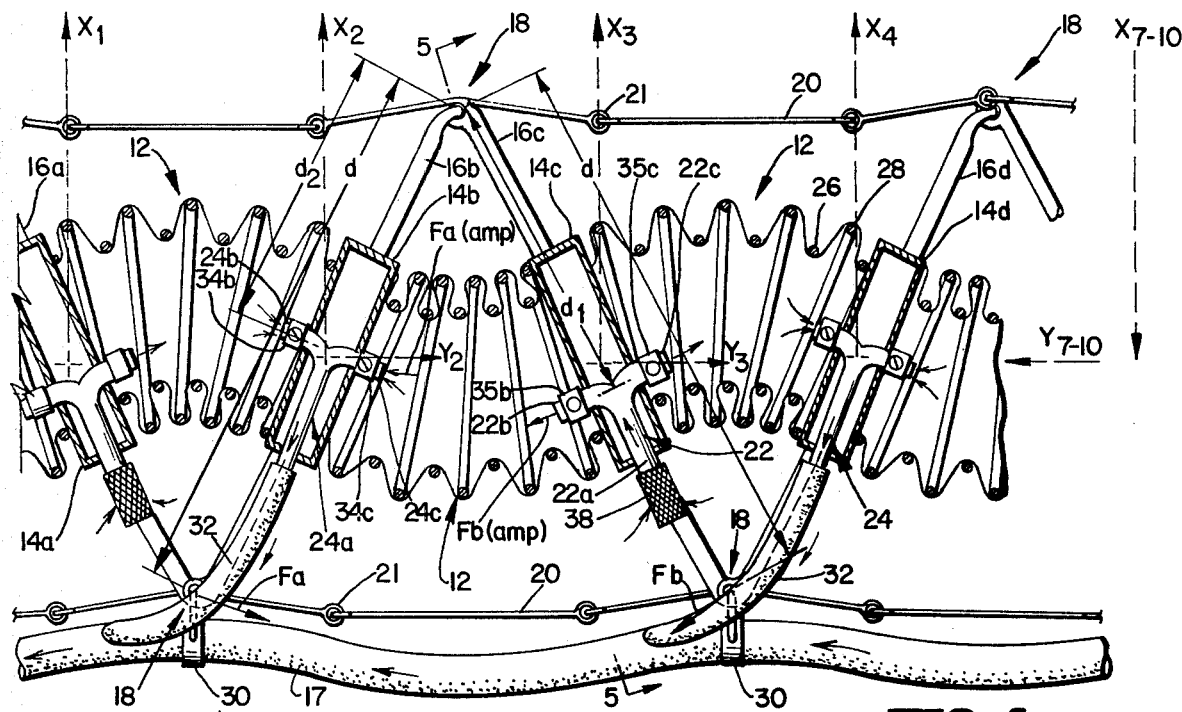
FIG. 4 is an enlarged partial sectional view of the apparatus with pumping elements shown in maximum expansion.

In apparatus 10, floats 14 are interconnected by means of the truss structure 13. Truss structure 13 comprises lever arm struts 16, arranged in a double triangular configuration, that extend through floats 14 and join together at their ends at universal connector units 18. As seen in FIGS. 3A and 3B, the ends of four adjacent lever arm struts 16 join together forming each connector unit 18. The connector units themselves may join together with interlocking pintles and rings; i.e., rings turned at 90° to each other and connected, as shown in FIG. 4. The struts 16 extend completely through the floats 14 and swivel connector units 18 are arranged alternately at opposite sides of apparatus 10 as seen more clearly in the side view in FIG. 2.

Interconnected chord segments forming expansion curb segments 20 are fastened between adjacent swivel connector units 18 to prevent damage to pumping elements 12a and 12b during rough surface activity of the water. The segments 20 limit the maximum expansion or flexing of pumping elements 12a and 12b by limiting the maximum separation of adjacent swivel connectors 18. When pumping elements 12a and 12b are in compression, curb segments 20 hang freely from swivel connectors 18; when the pumping elements are in expansion, the segments extend between adjacent connectors 18 along substantially a straight line (FIG. 4). Additional expansion curb segments (not shown) may be connected between the ends of adjacent floats 14 to prevent damage thereto caused by the floats colliding end-to-end during violent surface activity of the water.

In FIG. 2, a pumping element 12 is shown in a schematic view flexing with vertical wave motion of the water. The vertical flexing action of elements 12 will be described in more detail later in conjunction with FIG. 4. For maximum energy conversion efficiency, the size, longitudinal spacing and configuration of floats 14 is preferably designed to be related to the most effective selection of the annually available variations of waves in a given body of water. With such relationships, I have found that the pumping elements are maximally responsive to the vertical resultant forces of surface waves since each section of the elements successively flexes positively, then negatively by gravity, in response to a travelling wave. Accordingly, the amount of sea water pumped by each element 12 due to vertical wave motion is maximized.

As mentioned, the truss elements flex horizontally as well as vertically in response to the multiplanar surface movement of water. Thus, referring to FIG. 3A, the horizontal flexing action of pumping elements of 12a and 12b as they yield to horizontal surface currents of the water is shown. The pumping elements 12a and 12b flex in the plane horizontal to the water in response to currents at the surface of the water. The angle between the floats 14 and currents are constantly changing as the currents impinge on the floats 14 to repeatedly flex the pumping elements in the horizontal plane. As the floats 14 twist about, yielding to forces provided by horizontal surface currents, accordion-like flexing of the pumping elements 12a and 12b in the horizontal plane varies the volume of the flexible chambers of the elements and creates pressures for pumping water. For the purpose of comparison, a portion of apparatus 10 is shown in FIG. 3B with pumping elements 12a and 12b in maximum compression. In practice, this condition would occur only when pumping elements 12a and 12b are empty and the assembly is secured for shipment or repair.

It can be seen that as apparatus 10 snakes along the constantly changing surface contour of the water, pressure differentials caused by both vertical and horizontal flexing are produced in the pumping elements 12a and 12b. These compositely produced pressure differentials are substantially greater than the pressure differentials provided by vertical wave motion alone at the surface of the water.

Floats 14 are formed around and support the lever arm struts 16. In addition, the floats directly support inlets 22 and outlets 24 (FIG. 4).

Floats 14 are preferably solid, as shown, but may be of hollow construction. The faces of the floats are attached to the pumping elements by bonding the peripheral end face of individual sections of bellows to the floats.

As shown in FIG. 4, reinforcing spirals 26 and 28 are respectively wound along the inner and outer surfaces of each flexible tube section to prevent deformation of the corrugated configuration.

Still referring to FIG. 4, adjacent sections of pumping elements 12 are mounted between floats 14a–14d. Expansion curb segments 20 are coupled between adjacent swivel connector units 18 above and below the pumping elements. Curbs 20 are preferably formed of serially connected individual link rods at interlocking rings 21, but it is understood that conventional link chain can alternatively be used.

Oriented below the surface of the water and coupled to the swivel connector units 18 with collars 30 is collector tube 17. Output tube segments 32 are connected between outlets 24 and collector tube 17 to form a manifold for delivery of the pumped water directly to a load or indirectly through an independent manifold (not shown) that may be rigid and/or permanently attached to relatively stationary barges or sea bottom.

Each inlet 22 and outlet 24, shown in FIG. 4, comprises a T-member containing a pair of one-way valves for fluid flow control. Outlet 24 comprises a downwardly extending output portion 24a and shoulder feeder portions 24b and 24c. Oneway or check valves 34b and 34c are included, respectively in the shoulder portions 24b and 24c to allow inward flow to the outlet 24, but not reverse flow. Similarly, inlet 22 comprises a downwardly extending input portion 22a and shoulder divider portions 22b and 22c. One-way valves 35b and 35c are included respectively, in the shoulder portions 22b and 22c. Any suitable check valves may be employed.

Inlets 22 are positioned within floats 14 slightly offset from outlets 24. This provides clearance between adjacent shoulder portions of each set of adjacent inlet and outlet as they swing together with floats 14 during compression of the pumping elements 12.

As mentioned, the portion 22a of the inlet 22 extends downwardly from pumping elements 12 beneath the surface of the water. An intake screen 38 may be attached to the end of portion 22a to prevent take-in of foreign matter.

Still referring to FIG. 4, in response to natural forces applied by the movement of the water, floats 14b and 14c fan open, pivoting about swivel connector unit 18 creating a negative pressure in the pumping element 12 between these floats. In response to the negative pressure created in this section, valve 35b opens and valve 34c closes. The negative pressure induced in the section sucks water up through stem 22a of inlet 22 and into the element. The water in outlet 24 cannot escape back into the pumping element 12 through valve 34c since it is held closed by negative pressure.

When floats 14b and 14c subsequently swing together about swivel connector 18, a positive pressure is created in the section. This positive pressure now closes valve 35b and opens valve 34c. The water in the section then pumps through valve 34c down through portion 24a of outlet 24 to output tube segment 32. As this pumping element alternately expands and compresses, water is thus alternately sucked into and expelled out causing the high pressure water to flow through the segments 17. This same action occurs sequentially in all of the sections of the pumping elements 12, such as between floats 14a, 14b and 14c, 14d. The manifold structure of the segments 32 and the collector tube 17 combines the water outputs of all sections giving a substantial flow pressurized correspondingly to the maximum pressure induced in a pumping element by the bending moments in the truss assembly 13, and thus representing a substantial energy conversion.

As an important aspect of the invention, the interconnected lever arm struts 16 form a flexible beam or truss structure that amplifies the natural multiplanar forces to thus amplify the pumping actions. The forces provided by movement of water is, according to the invention, amplified before applying these forces to flex the pumping elements 12. Thus, referring again to FIG. 4, the four floats 14a–14d and flexible pumping element sections are shown in side view. Passing through floats 14a–14d are, respectively, lever arm struts 16a–16d. It is understood that the struts 16, in a double triangular configuration, are actually interconnected at each swivel connector unit 18, as seen in FIGS. 3A and 3B.

To understand one aspect of the operation of the flexible beam or truss structure 13 and the manner by which natural forces of water motion are amplified in the present invention, assume that floats 14b and 14c experience external forces at wave crests designated by forces $X_2$ and $X_3$ at the area centroid of the floats 14b and 14c. These forces oppose the sets of equal but opposite forces of gravity at the wave troughs to cause bending moment forces at the chord segments 20. Resultant forces $F_a$ and $F_b$ occur at the lower universal connector units 18 tending to pivot floats 14b, 14c toward each other about their common upper connector unit 18.

Of particular importance, the resultant forces $F_a$, $F_b$ that compress the pumping element section between these floats 14b, 14c is applied through a lever arm distance of $d$ extending from the upper connector unit. The pivot moment thus provided by the lever arms $d$ provides a mechanical advantage. The amplification factors at the inlet 22 and the outlet 24 occurring at the distances $d_1$, $d_2$, are represented by $d/d_1$ and $d/d_2$, respectively, so that the forces $F_b$, $F_a$ are actually amplified by the formulae:

$F_b$ (amplified) $= F_b \cdot d/d_1$ $F_a$ (amplified) $= F_a \cdot d/d_2$.

Obviously, in addition to leverage provided by struts 16, bending moment forces provided by chord segments 20 when they are fully extended further contribute to amplification of the multiplanar forces. Analysis of the bending moments is conventional and omitted herein.

The action of adjacent struts 16b and 16c compressing the section of the elements 12 can be compared to the action of the arms of a nutcracker supplying a mechanical advantage to the forces concentrated at the ends of the nutcracker while cracking a nut positioned at a midpoint. The described mechanical advantage exists for not only compressing, as described, but also for expanding each pumping element. Furthermore, the action exists in a similar manner for horizontal pumping like an object being secured in the jaws of pliers.

Preferably, in order to prevent barnacle or other build-up of salt water weight on apparatus 10, the apparatus is coated with an anti-fouling composition 48 (FIG. 5) such as cobalt, copper and maganese salts of terephthalic acid, as described in U.S. Pat. No. 3,623,896 to Leipold. It is understood that other suitable compositions or a furry surface texture could also be used.

Figure 5:
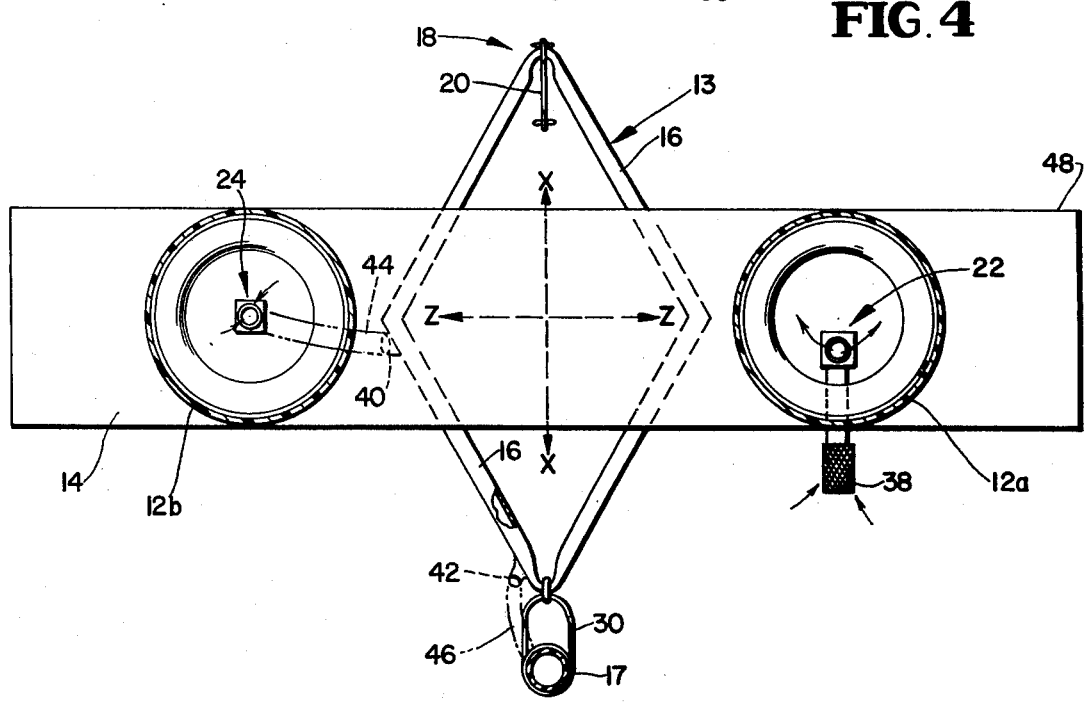
FIG. 5 is an enlarged sectional view of the apparatus taken along the lines 5—5 in FIG. 4.

The entire collector manifold structure including collector tube 17 and output tube segments 32 is formed of a flexible material, such as rubber, so that it yields to multiplanar movement of apparatus 10. FIG. 5 however, in dotted lines, shows another embodiment of apparatus 10 wherein lever arm struts 16 are tubular and function as a portion of the output tube segments to transfer the pumped water from outlets 24 to collector tube 17. Collars 40 and 42 are provided for receiving short tube segments 44 and 46. Segments 44 and 46 extend, respectively, to outlet 24 and collector tube 17. Water, pumped by element 12b in FIG. 5, flows out the outlet 24, through tubular segment 44, strut section 16, tubular segment 46 to the collector tube 17. Since the relatively long output tube segment 32 is eliminated and replaced with the strut section 16, the overall apparatus 10 is simplified and more durable.

When the apparatus 10 is placed and anchored at sea in position extending outwardly from the shore, it advantageously serves the additional function of a breakwater. The pumping elements 12 are continuous and absorb the energy of the waves. Because the elements 12 are flexible and follow the contour of the surface, the waves are broken up very effectively, much in the same way as recently developed lane dividers for swimming pools do on a much smaller scale. Supplemental wave attenuation may be obtained by a series of self-activating discharges at the vulnerable moving point of each wave.

In this disclosure, there is shown and described only the preferred embodiments of the invention, but, as aforementioned, it is to be understood that the invention is capable of use in various other combinations and environment and is capable of changes or modifications within the scope of the inventive concept as expressed herein.

What is claimed is:

1. Apparatus for converting surface motion of a fluid body into usable energy comprising:
   pumping means responsive to multiplanar activating forces for pumping a fluid;
   flotation means distributed along a length of said pumping means for floating said pumping means at active strata of the fluid body;
   a plurality of lever arm struts rigidly connected to said flotation means, the ends of said lever arm struts being pivotally coupled together, including means for preventing excessive expansion of said pumping means, thereby converting natural motions of the fluid body into multiplanar forces for activating said pumping means; and
   means for transferring the pumped fluid from said pumping means to a load.

2. The apparatus of claim 1 wherein said pumping means includes an inlet and an outlet, said inlet oriented to receive the fluid to be pumped, and valve means cooperating with said inlet and outlet for pumping the fluid responsive to variations in the volume of said element.

3. The apparatus of claim 2 wherein said pumping means includes a flexible tubular pumping element.

4. The apparatus of claim 3 wherein said flotation means includes a plurality of floats distributed substantially along the entire length of said flexible tubular element.

5. The apparatus of claim 1 wherein said flexible tubular element is corrugated.

6. The apparatus of claim 1 wherein said preventing means includes expansion curb segment means attached at connected ends of said struts to form a flexible truss structure.

7. The apparatus of claim 1 wherein said transferring means includes first pipe means for receiving the pumped fluid from said pumping means; and second pipe means, communicating with said first pipe means, for transferring the pumped fluid to the load.

8. The apparatus of claim 7 wherein said first pipe means includes a plurality of flexible pipe segments connected between said pumping means and said second pipe means.

9. The apparatus of claim 7 wherein said second pipe means includes a flexible collector pipe supported by said truss structure.

10. The apparatus of claim 9 wherein said flexible collector pipe is maintained beneath the surface of said fluid.

11. The apparatus of claim 1 wherein said lever arm struts are formed of tubular strut segments, said first pipe means including some of said tubular strut segments connected between said pumping means and said second pipe means.

12. The apparatus of claim 1 wherein said apparatus is coated with an anti-fouling composition layer.

13. Water powered pumping apparatus comprising:
at least one flexible tubular pump responsive to multiplanar forces for pumping a fluid;
flotation means distributed along the length of said pump for floating said pump at the surface of water, said flotation means providing axial flexing of said pump from natural forces provided by multiplanar movements of the water;
a flexible truss structure cooperating with said flotation means for axially flexing said pump with bending moments derived from said natural forces; and
means for directing the pumped fluid to a load.

14. The apparatus of claim 13 including means for limiting the maximum amount of flexing of said pump.

15. The apparatus of claim 14 including universal connector units between adjacent flotation means on said truss structure, said limiting means comprising interconnected links, said links attached to said truss structure for limiting the maximum amount of flexing of said pump.

16. The apparatus of claim 13 wherein is provided two pumps connected in parallel supported on said flotation means.

17. The apparatus of claim 13 wherein is provided check valve means at the entrance and exit of said pumps.

* * * * *